(12) United States Patent
Lutz

(10) Patent No.: US 11,920,620 B2
(45) Date of Patent: Mar. 5, 2024

(54) CONNECTING ELEMENT

(71) Applicant: Arnold Umformtechnik GmbH & Co. KG, Forchtenberg-Ernsbach (DE)

(72) Inventor: Florian Lutz, Sindringen (DE)

(73) Assignee: Arnold Umformtechnik GmbH & Co. KG, Forchtenberg-Ernsbach (DE)

( * ) Notice: Subject to any disclaimer, the term of this patent is extended or adjusted under 35 U.S.C. 154(b) by 0 days.

(21) Appl. No.: 17/595,669

(22) PCT Filed: May 14, 2020

(86) PCT No.: PCT/EP2020/063464
§ 371 (c)(1),
(2) Date: Nov. 22, 2021

(87) PCT Pub. No.: WO2020/239460
PCT Pub. Date: Dec. 3, 2020

(65) Prior Publication Data
US 2022/0220993 A1    Jul. 14, 2022

(30) Foreign Application Priority Data
May 24, 2019   (DE) .......................... 102019207681.5

(51) Int. Cl.
*F16B 19/00* (2006.01)
*F16B 19/02* (2006.01)
*F16B 33/00* (2006.01)

(52) U.S. Cl.
CPC ............ *F16B 19/02* (2013.01); *F16B 33/002* (2013.01)

(58) Field of Classification Search
CPC ........... F16B 15/06; F16B 21/12; F16B 19/02
(Continued)

(56) References Cited

U.S. PATENT DOCUMENTS 2,896,285 A * 6/1954 Morin
4,353,233 A   10/1982 Chapman
(Continued)

FOREIGN PATENT DOCUMENTS

CH     207574 A    11/1939
CN    2771548 Y    4/2006
(Continued)

OTHER PUBLICATIONS

Chinese First Office Action dated Nov. 2, 2022, 7 pages (with English Translation).
(Continued)

*Primary Examiner* — Gary W Estremsky
(74) *Attorney, Agent, or Firm* — Boyle Fredrickson, S.C.

(57) ABSTRACT

The invention relates to a connecting element for pressing into or embedding in a component, having a shank which extends along a longitudinal central axis of the connecting element, wherein the shank is provided with ribs extending in a radial direction with respect to the shank and wherein the shank has, at least partially, a polylobular cross section, wherein the periphery of the polylobular cross section is convexly curved along its entire length, is arranged between a circumscribed circle and an inscribed circle, and, as seen in the radial direction, has regions with a larger radius and regions with a smaller radius, wherein an angular position of the regions with a smaller radius and of the regions with a larger radius changes along the shank, as seen along the longitudinal central axis.

21 Claims, 11 Drawing Sheets

(58) Field of Classification Search
USPC .................. 411/454, 455, 491, 509, 510
See application file for complete search history.

(56) References Cited

U.S. PATENT DOCUMENTS

| | | | | |
|---|---|---|---|---|
| 4,702,349 | A * | 10/1987 | Zenhausern | E06C 7/081 411/908 |
| 4,718,802 | A * | 1/1988 | Rockenfeller | F16B 15/06 411/455 |
| 5,324,151 | A * | 6/1994 | Szudarek | F16L 3/08 248/74.1 |
| 5,489,179 | A * | 2/1996 | Gabriel | F16B 33/008 52/582.1 |
| 5,749,692 | A * | 5/1998 | Kish | F16B 33/008 411/456 |
| 6,305,892 | B1 * | 10/2001 | Qiao | F16B 21/082 411/510 |
| 6,899,500 | B2 * | 5/2005 | LeVey | B21H 3/02 411/416 |
| 7,101,134 | B2 * | 9/2006 | LeVey | B21H 3/02 411/416 |
| 7,207,761 | B2 * | 4/2007 | Dill | F16B 15/06 411/499 |
| 7,665,942 | B2 * | 2/2010 | Tadros | F16B 15/06 411/455 |
| 8,333,539 | B2 * | 12/2012 | Mahdi | F16B 15/06 411/456 |
| 9,308,027 | B2 | 4/2016 | Jackson | |
| 2015/0184686 | A1 | 7/2015 | Hasegawa | |
| 2016/0195123 | A1 * | 7/2016 | Miller | F16B 19/14 411/34 |

FOREIGN PATENT DOCUMENTS

| | | |
|---|---|---|
| CN | 1961157 A | 5/2007 |
| CN | 101403407 A | 4/2009 |
| CN | 102753843 A | 10/2012 |
| CN | 203670399 U | 6/2014 |
| CN | 104533926 A | 4/2015 |
| CN | 105508365 A | 4/2016 |
| CN | 105637235 A | 6/2016 |
| CN | 105705812 A | 6/2016 |
| DE | 102009053852 A1 | 5/2011 |
| DE | 102010000702 A1 | 7/2011 |
| DE | 102011080505 A1 | 2/2013 |
| DE | 102013104849 A1 | 12/2013 |
| DE | 102015007567 A1 | 12/2016 |
| DE | 102015223473 A1 | 6/2017 |
| IT | TO940955 A1 | 5/1996 |
| JP | S54152744 U | 12/1979 |
| JP | S55154659 U | 11/1980 |
| JP | S639509 U | 1/1988 |
| JP | H0994771 A | 4/1997 |
| JP | H1054410 A | 2/1998 |
| KR | 1020180084160 A | 7/2018 |
| TW | 393343 B | 6/2000 |

OTHER PUBLICATIONS

Japanese Office Action dated Dec. 6, 2022, 7 pages (with English Translation).

Hearing Notice for Indian Patent Application No. 202117059493, dated Jan. 3, 2024.

* cited by examiner

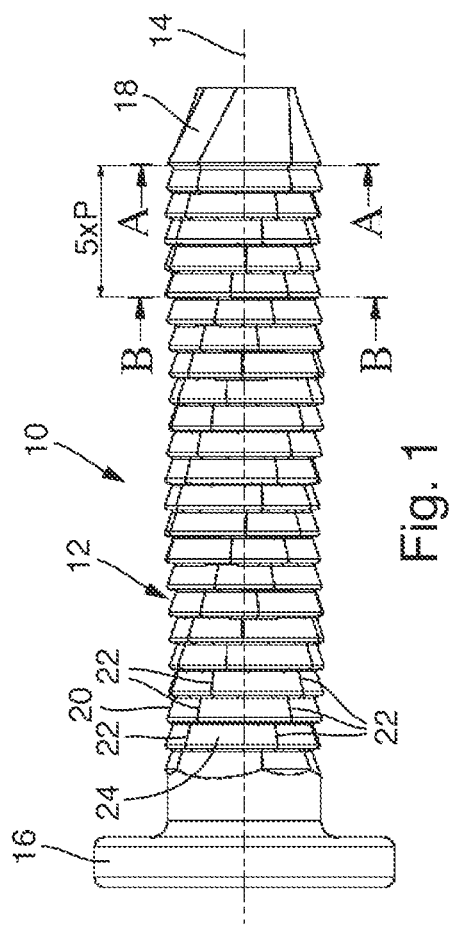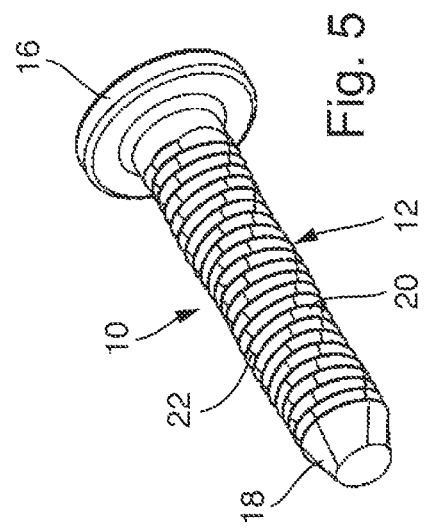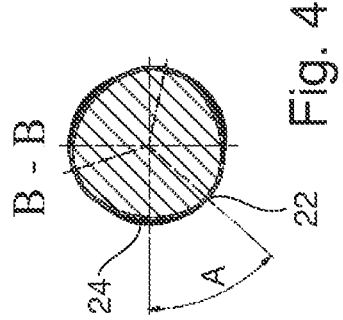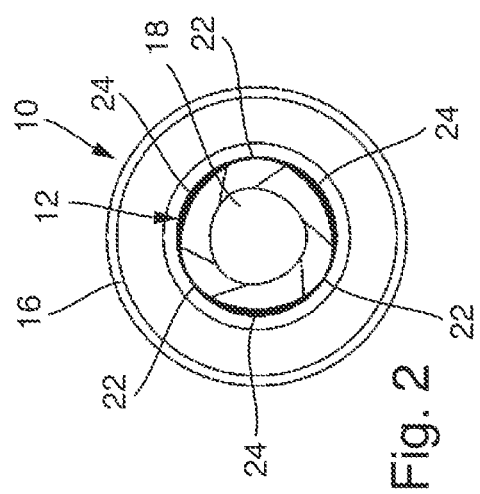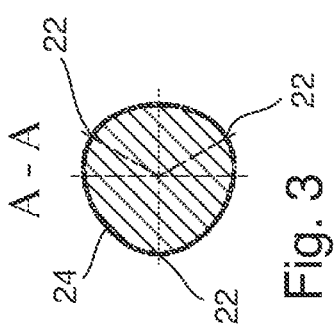

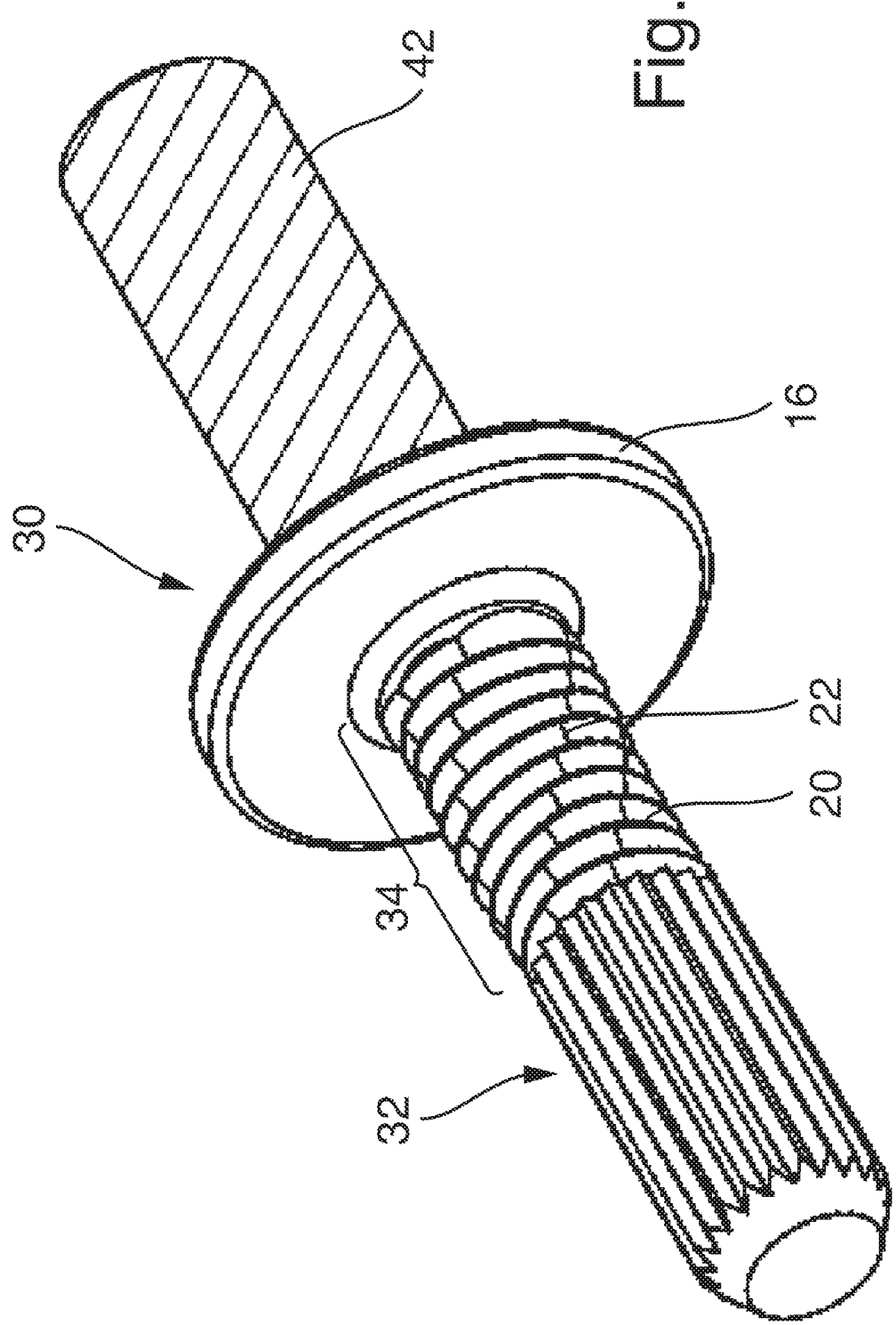

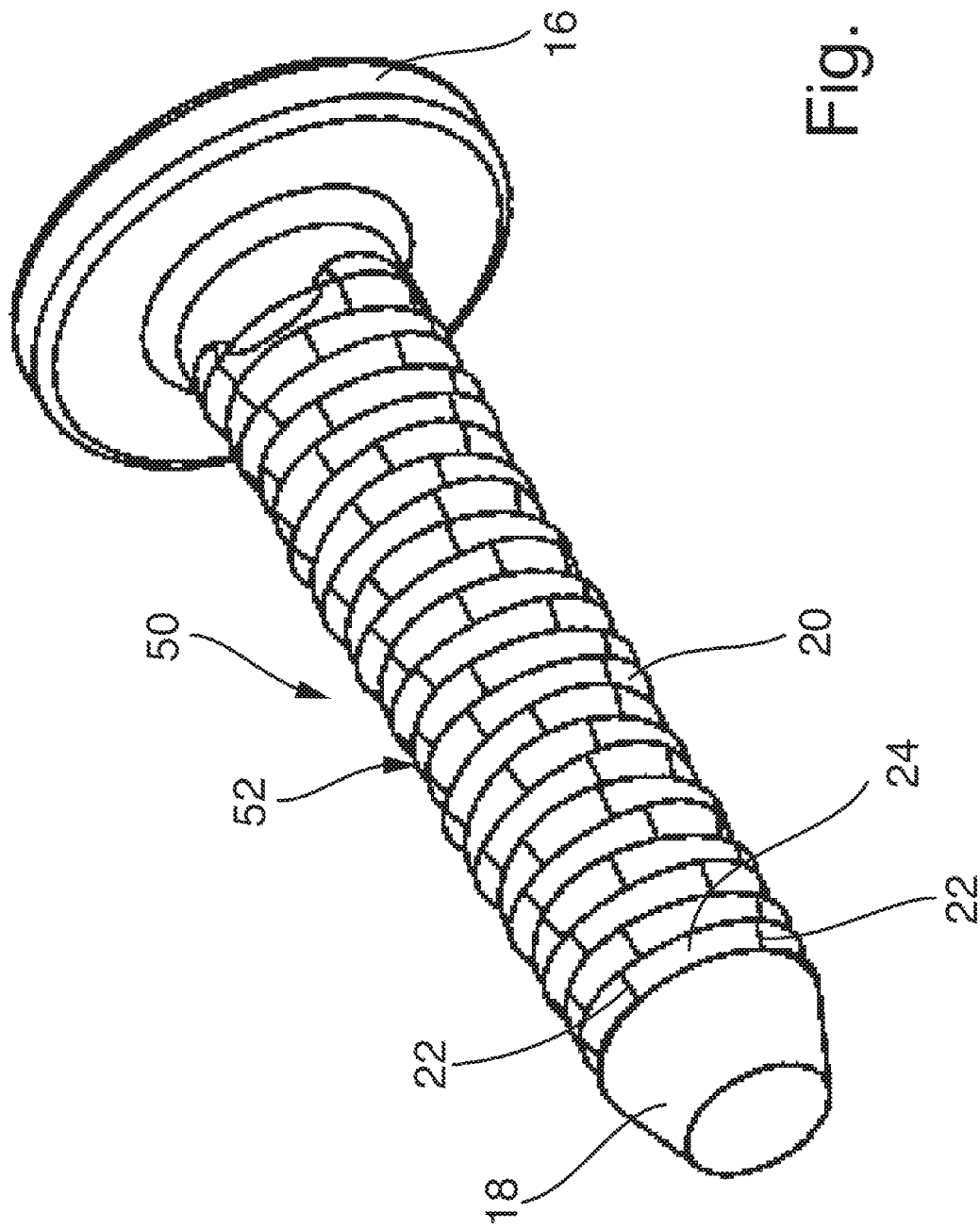

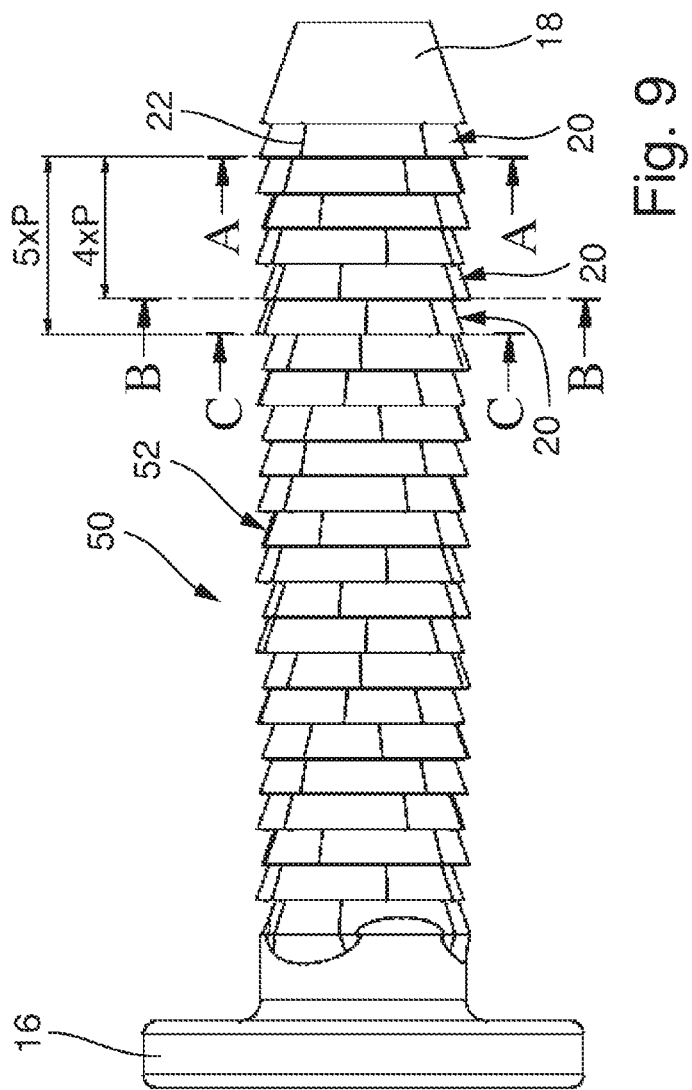
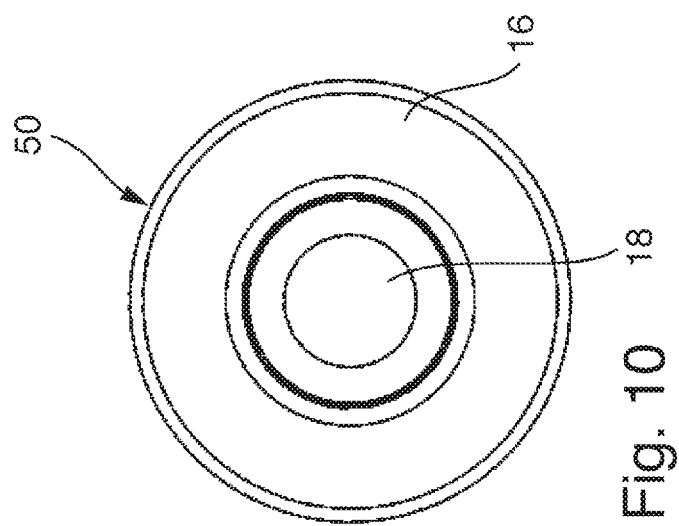

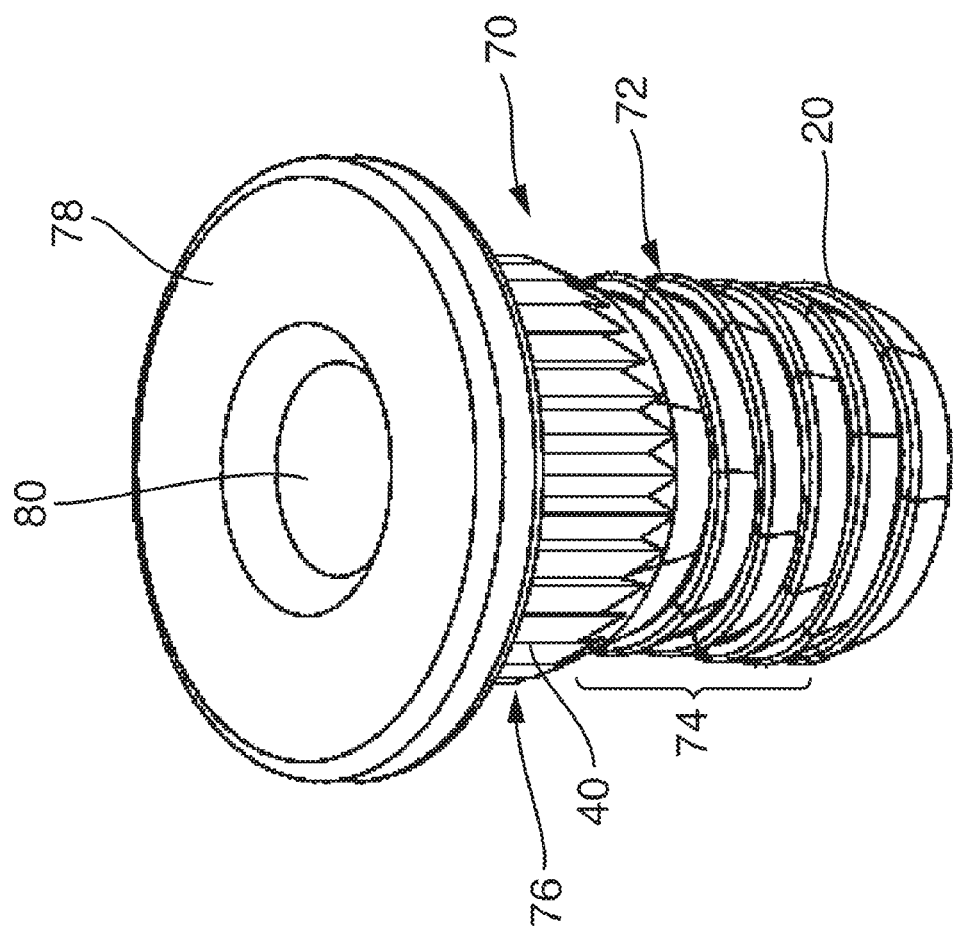

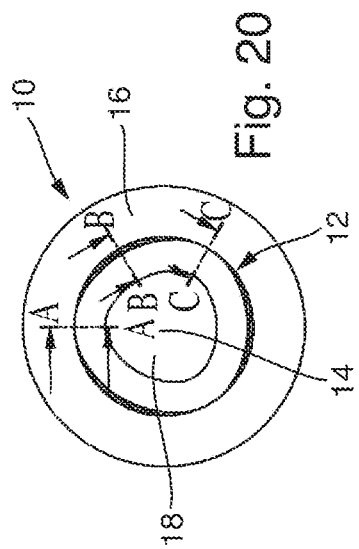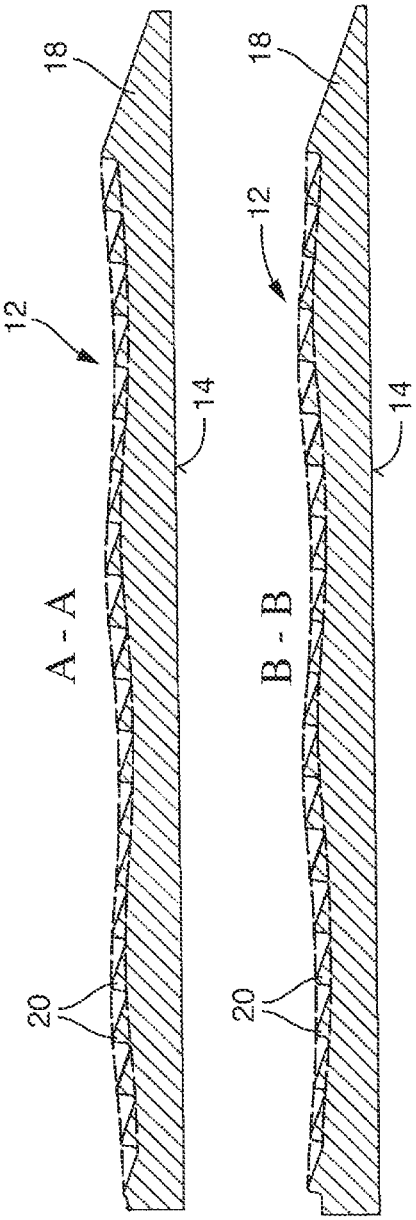

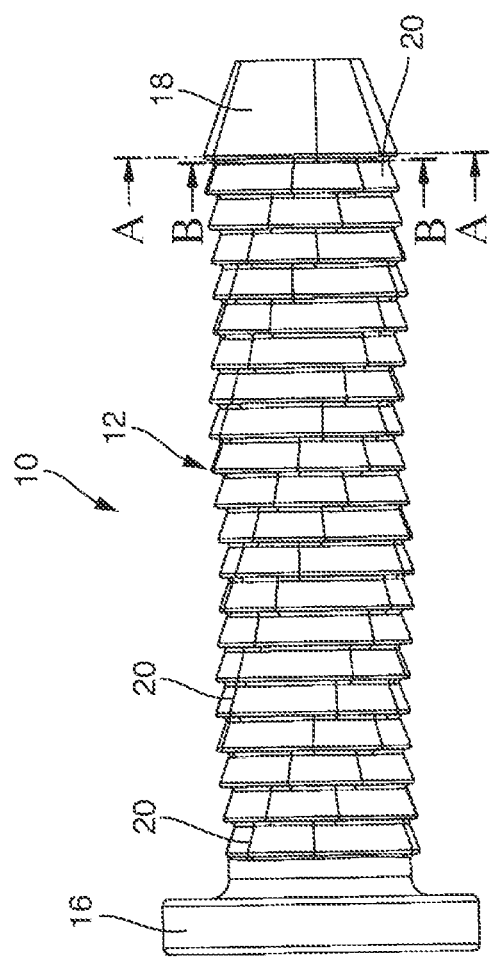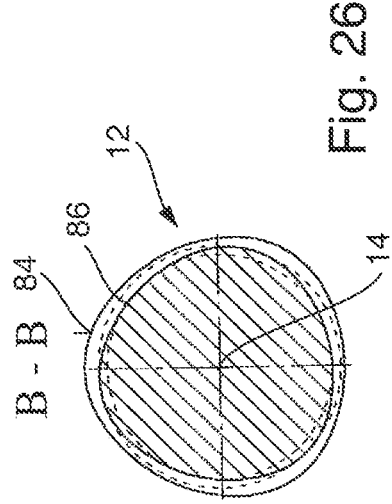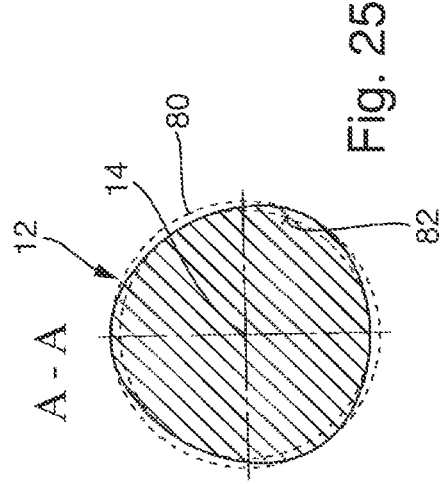

CONNECTING ELEMENT

FIELD OF THE APPLICATION

The invention relates to a connecting element for pressing into or embedding in a component, having a shank which extends along a longitudinal central axis of the connecting element, wherein the shank is provided with ribs extending in a radial direction with respect to the shank and wherein the shank has, at least partially, a polylobular cross section, wherein the periphery of the polylobular cross section is convexly curved along its entire length, in particular is arranged between a circumscribed circle and an inscribed circle, and, as seen in the radial direction, has regions with a larger radius or smaller curvature and regions with a smaller radius or larger curvature.

BACKGROUND

By way of the invention, a connecting element for pressing into or embedding in a component is intended to be improved with regard to anchoring in the component.

SUMMARY

According to the invention, to this end, a connecting element having the features of claim 1 is provided. In the case of a connecting element for pressing into or embedding in a component, having a shank which extends along a longitudinal central axis of the connecting element, wherein the shank is provided with ribs extending in a radial direction with respect to the shank and wherein the shank has, at least partially, a polylobular cross section, wherein the periphery of the polylobular cross section is convexly curved along its entire length, in particular is arranged between a circumscribed circle and an inscribed circle, and, as seen in the radial direction, has regions with a larger radius or smaller curvature and regions with a smaller radius or larger curvature, an angular position of the regions with a smaller radius and of the regions with a larger radius changes along the shank, as seen along the longitudinal central axis. In other words, as seen along the length of the shank, the polylobular cross section of the shank is twisted. As a result, it is possible, as seen along the longitudinal central axis of the shank, for the regions, extending as far as the circumscribed circle of the polylobular cross section, with a smaller radius to be offset with respect to one another. These outwardly protruding regions with a smaller radius are primarily responsible for anchoring the connecting element in a component. While the connecting element according to the invention is being pressed into or embedded in a component, it is now possible for the regions, protruding in the radial direction, with a smaller radius not to overlap or be aligned in projection or as seen alone the longitudinal central axis. As a result, a higher press-out force can be achieved. This is very advantageous in particular when the connecting element according to the invention is pressed in. This is because the regions with a smaller radius of the individual ribs of the shank have at least partially a different angular position. The effect, occurring in conventional connecting elements, that these protruding regions with a smaller radius push material of the component away in a radial direction, this material then no longer being available for anchoring subsequent ribs, does not occur with the connecting element according to the invention. Specifically when conventional connecting elements for pressing in are pressed into aluminum, it is apparent that the material flows only little into transverse knurling and is largely sheared off and pushed away. As a result, only the first transverse-knurling turns, located at the front on the shank, are taken up by material of the component, with the result that the press-out force is relatively low. Furthermore, the press-out force largely depends, in conventional connecting elements for pressing in, on the tolerance of the core hole. According to the invention, the polylobular cross section of the shank is twisted along the shank axis, for example helically twisted. As a result, the high points of the knurling, which are formed by the regions with a small radius of the cross section, are no longer aligned. As a result, even knurls or transverse knurls that are located further back can still take material that has not yet been pushed away. As a result, the overall degree of filling of the knurling or of the ribs and thus the press-out force upon pressing into or embedding in a component can be improved considerably. This is the case in particular in components made of aluminum or plastic. The ratio of the smaller radius to the larger radius changes with the dimension, i.e. the maximum transverse dimension, of the shank.

In a development of the invention, the angular position of the regions with a smaller radius and of the regions with a larger radius changes by a constant amount per unit length along the shank.

This results in a helical twist of the polylobular cross section of the shank with a constant pitch.

In a development of the invention, polylobular cross section has n regions with a smaller radius, and the angular position changes by an angle of 360°/n along the entire length of the shank.

As a result, it is possible for the regions with a smaller radius no longer to be aligned along the entire length of the shank. Thus, particularly high press-out forces and thus very secure anchoring of the connecting, elements can be achieved.

In a development of the invention, regions with different polylobular cross sections alternate as seen along the length of the shank.

In a development of the invention, regions with a circular cross section and with a polylobular cross section alternate as seen along the length of the shank.

In a development of the invention, in the portion of the shank with a polylobular cross section, the shank has a polylobular cross section at each point of this portion.

Both the outside diameter of the shank and the core diameter of the shank are configured in a polylobular manner in this case. In this way, the shank can be designed stably with the ribs.

In a development of the invention, in the portion of the shank with a polylobular cross section, a sectional view of the shank has an undulating external contour at each angular position about the longitudinal central axis.

The undulating external contour in a section plane that contains the longitudinal central axis ensures that the connecting element is anchored securely in the surrounding material. This is realized, according to the invention, around the entire periphery of the connecting element. Advantageously, in this section plane, an imaginary line that connects the deepest points, or the points located closest to the longitudinal central axis, between two ribs likewise extends in an undulating manner.

In a development of the invention, in the portion of the shank with a polylobular cross section, a profile death of the ribs changes by at most 50%.

In this way, secure retention of the connecting element in the pressed-in state can be ensured.

In a development of the invention, in the portion of the shank with a polylobular cross section, a profile depth of the ribs changes by at most 10%, and in particular the profile depth is constant.

Such a small change in the profile depth or a constant profile depth ensures secure retention of the connecting element in the pressed-in state.

In a development of the invention, the cross section is designed as a curve of constant width.

As a result, a transverse dimension, measured in a radial direction, of the polylobular cross section is always the same, regardless of the angular position. This makes it easier to produce the connecting element by means of rolling tools, in particular rolling dies.

In a development of the invention, the cross section has three regions with a smaller radius or larger curvature and three regions with a larger radius or smaller curvature.

As seen around the periphery, the cross section thus has three outwardly protruding regions, namely the regions with a smaller radius or larger curvature, the apexes of which lie on the circumscribed circle, and the cross section has three regions with a larger radius or smaller curvature, the apexes of which lie on the inscribed circle. The regions with a smaller radius and the regions with a larger radius are spaced apart equally from one another. Such a cross section can be produced cost-effectively with a high level of precision and in large quantities by means of rolling methods, in particular by means of rolling dies.

In a development of the invention, the periphery of the cross section is designed to be continuous without corners.

This also makes it easier to produce the connecting element according to the invention.

In a development of the invention, the ribs extend at least partially in the peripheral direction.

By means of ribs in the peripheral direction, high press-out forces can be achieved.

In a development of the invention, the angular position of the regions with a smaller radius or larger curvature and of the regions with a larger radius or smaller curvature changes by about 10° to 40° for each rib as seen in the longitudinal direction of the shank.

In this way, after about ten ribs, a complete revolution of the angular position of the regions with a smaller radius and of the regions with a larger radius can be achieved. Even in the case of relatively short shanks of connecting elements, high press-out forces can be achieved as a result. The angular position or the regions with a smaller radius and of the regions with a larger radius can also change by about 10° to 40° per millimeter of length of the shank.

In a development of the invention, the ribs extend at least partially in an axial direction.

By means of ribs extending in an axial direction, reliable security against twisting of the connecting element in the component can be achieved.

In a development of the invention, the ribs extend along at least a part of the length of the shank in the peripheral direction, and the ribs extend along at least a part of the length of shank in the axial direction.

In this way, extremely secure anchoring of the connecting element both in the peripheral direction and in the longitudinal direction of the shank can be achieved. In this case, either a part having ribs extending in the axial direction or a part having ribs extending in the peripheral direction can be provided with the polylobular cross section and the changing angular position of the regions with a smaller radius or larger curvature and of the regions with a larger radius or smaller curvature, or both the part having ribs in the peripheral direction and the part having ribs in the axial direction can accordingly have a polylobular cross section.

In a development of the invention, the ribs extend at least along a part of the length of the shank in the peripheral direction, and the angular position of the regions with a smaller radius or larger curvature and of the regions with a larger radius or smaller curvature changes alternately in a positive direction and in a negative direction starting from a first rib.

The direction in which the angular position changes can in this case change from rib to rib or it is also possible, for example, for there to be a plurality of ribs in succession with a change in a positive direction and then one or more ribs with a change in a negative direction. As a result of the alternation of the direction in which the angular position changes, alignment of the regions with a larger radius and of the regions with a smaller radius along the length of the shank can either be completely avoided or be set such that alignment occurs again only after a relatively large number of ribs. As a result, a press-out force of the connecting element according to the invention can be increased.

In a development of the invention, the angular position of the regions with a smaller radius and of the regions with a larger radius changes in a clockwise and/or counterclockwise direction as seen along the longitudinal central axis.

In a development of the invention, the connecting element is formed at least partially from steel, aluminum, copper or brass.

Further features and advantages of the invention will become apparent from the claims and the following description of preferred embodiments of the invention in conjunction with the drawings. Individual features of the various embodiments illustrated and described can be combined with one another as desired without exceeding the scope of the invention. This also goes for the combination of individual features without further individual features in conjunction with which they are described or shown.

BRIEF DESCRIPTION OF THE DRAWINGS

In the drawings:

FIG. 1 shows a side view of a connecting element according to the invention according to a first embodiment, FIG. 2 shows a front view of the connecting element in FIG. 1.

FIG. 3 shows a sectional view on the section plane A-A in FIG. 1,

FIG. 4 shows a sectional view on the plane B-B in FIG. 1,

FIG. 5 shows an isometric illustration of the connecting element in FIG. 1 obliquely from above, FIG. 7 shows an isometric illustration of connecting element in FIG. 6 obliquely from above, FIG. 8 shows an isometric illustration of a connecting element according to the invention according to a further embodiment obliquely from above, FIG. 9 shows a side view of the connecting element in FIG. 8, FIG. 10 shows a front view of the connecting element in FIG. 8, FIG. 14 shows an isometric illustration of a connecting element according to the invention according to a further embodiment obliquely from the rear, FIG. 20 shows a view of a connecting element according to a further embodiment of the invention from below, FIG. 21 shows a view on the section plane A-A in FIG. 20, FIG. 22 shows a view on the section plane B-B in FIG. 20, FIG. 23 shows a view on the section plane C-C in FIG. 20, FIG. 24 shows a side view of the connecting element in FIG. 20, FIG. 25 shows a view on the section plane A-A in FIG. 24, and FIG. 26 shows a view on the section plane B-B in FIG. 24.

DETAILED DESCRIPTION

Figure 6:
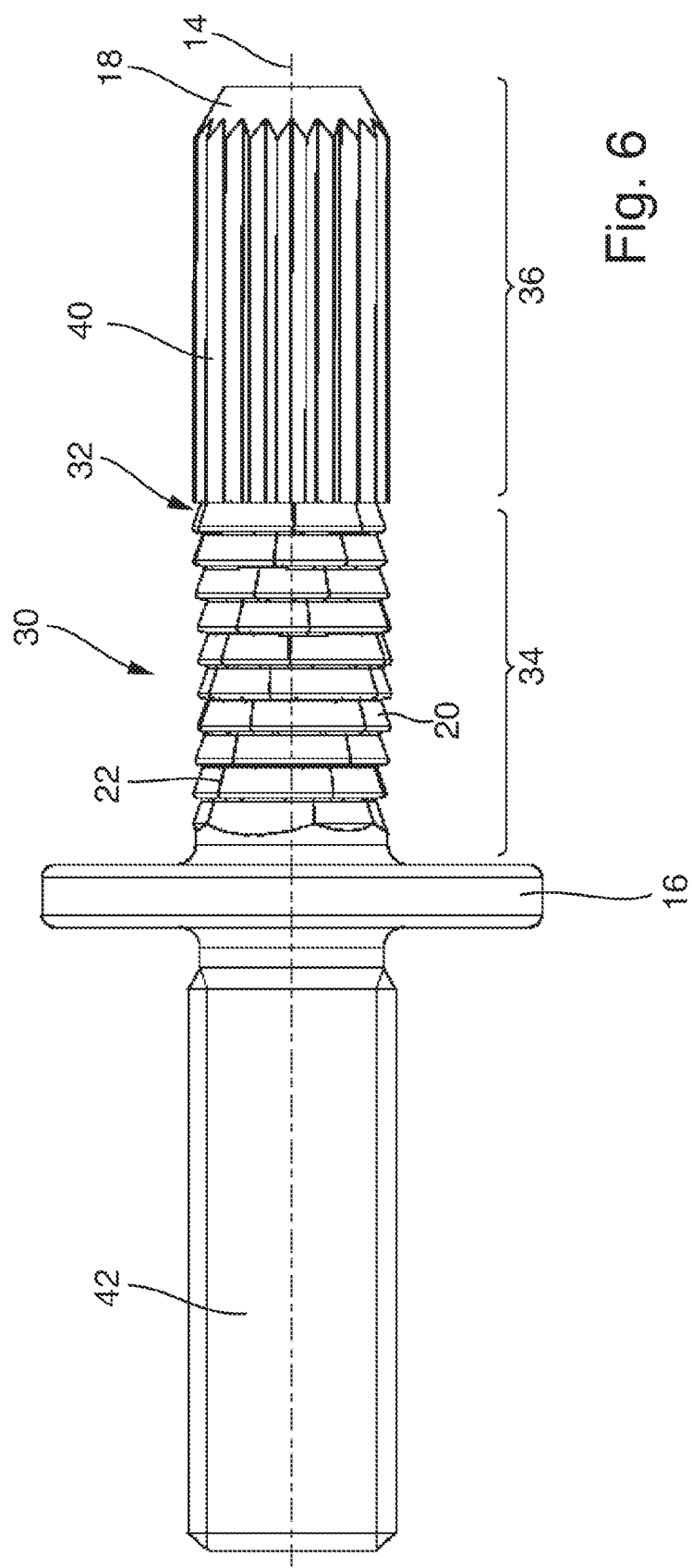
FIG. 6 shows a side view of a connecting element according to the invention according to a further embodiment.

FIG. 1 shows a connecting element 10 according to the invention according to a first embodiment of the invention. The connecting element 10 is intended to be pressed into or embedded in a component (not illustrated) and has a shank 12, which extends along a longitudinal central axis 14 of the connecting element 10. At one end, illustrated on the left in FIG. 1, of the shank 12, a head 16 of the connecting element 10 is provided, which has a larger diameter than the shank 12. The head 16 is designed in a disk-like manner. The head 16 can be provided, on ins side illustrated on the left in FIG. 1, with a driving formation, but a driving formation is not usually provided on the head 16 since the connecting element 10 is intended to be pressed into or embedded in a component.

At the end illustrated on the right in FIG. 1, the shank 12 has a frustoconical narrowing 18, which makes it easier to introduce it into a core hole.

The shank 12 is provided with numerous ribs 20 extending in a radial direction. The ribs 20 extend in a peripheral direction and each have a triangular cross section, as can be seen in FIG. 1. A height or the ribs, which is measured along the longitudinal central axis 14, is the same for all the ribs. The ribs 20 are each designed in a frustoconical manner, wherein a side with a smaller diameter of each rib 20 faces the free end 18 of the shank 12, i.e. lies in the press-in direction of the connecting element 10. Toward the side of the head 16, the frustoconical portion of each rib 20 is adjoined by a much shorter portion, which lies approximately perpendicular to the longitudinal central axis 14 and in which a reduction in diameter occurs. The diameter of that end of each rib that is located on the left in FIG. 1 and the diameter of that end of each rib 20 that is located on the right in FIG. 1 is approximately the same. As a whole, the shank 12 thus has, in the region of the ribs 20, a sawtooth-like external contour. The shank 12 can thus be pressed into a core hole in a component. By contrast, the sawtooth-like design of the external contour of the shank 12 with the ribs 20 makes it much harder to pull the shank 12 out of the core hole in the component. This is because, when the connecting element 10 is pulled out of a core hole, i.e. to the left in FIG. 1, the ribs 20 dig into the material, surrounding them, of the wall of the core hole.

FIG. 2 shows a front view of the connecting element 10 in FIG. 1, wherein the viewing direction in FIG. 2 is toward the frustoconically narrowed end 18 of the shank 12. It is apparent from this view that a cross section of the shank 12 is not circular, but polylobular with three outwardly protruding regions and three regions connecting the outwardly protruding regions. Such a cross section car also be referred to as trilobular. The cross section of the shank 12 has a periphery with three regions 22 with a smaller radius or larger curvature that are spaced apart regularly from one another by in each case 120°. These regions 22 with a smaller radius form the regions of the periphery of the cross section of the shank 12 that protrude in a radial direction. Arranged between each of the regions 22 with a smaller radius are regions 24 with a larger radius or smaller curvature, which are necessarily likewise spaced apart regularly from one another, specifically at an angle of 120° to one another. These regions 24 with a larger radius connect the outwardly protruding regions 22 with a smaller radius. The periphery of the cross section of the shank 12 is convexly curved throughout and has no corners or edges. The periphery, discernible in FIG. 2, of the shank 12 corresponds to the cross section in the region of the section plane A-A in FIG. 1.

In FIG. 1, the respective apex of the regions 22 with a smaller radius on each rib 20 is indicated schematically by means of dashes. It is apparent that the regions 22 with a smaller radius change their angular position as seen in the longitudinal direction of the shank 12, i.e. in the direction of the longitudinal central axis 14. In the direction from the head 16 to the end 18 of the shank 12, the cross section of the shank 12 with each rib 20 is twisted a little in the clockwise direction. As a result, the regions 22 with a smaller radius are arranged, as is apparent from FIG. 1, such that a line laid through the regions 22 with a smaller radius forms a helix around the shank 12. This is because, from rib 20 to rib 20, the angular position of the regions 22 with a smaller radius and consequently also the angular position of the regions 24 with a larger radius is changed by a constant amount.

FIG. 3 shows a view on the section plane A-A in FIG. 1. It is apparent that the regions 22 with a smaller radius are spaced apart at an angle of 120° to one another, and that the region 22 with a smaller radius, illustrated on the left in FIG. 3, is at an angle of 0° to a horizontally extending axis.

FIG. 4 shows a view on the section plane B-B in FIG. 1. The section plane B-B is arranged at a distance of 5×P from the section plane A-A, i.e. at a distance of five times the height of each rib 20. It is apparent from FIG. 4 that the region 22 with a smaller radius, still located on the left in FIG. 3, is now arranged in a manner twisted downward through an angle A. This angle A is about 50° in the illustrated embodiment. In FIG. 4, the angular position, taken from FIG. 3, of the region 22 in the section plane A-A is also apparent by way of blackened regions. Starting from the section plane A-A in FIG. 1, the angular position of the regions 22 with a smaller radius and the angular position of the regions 24 with a larger radius thus changes in the direction of the head 16 by 10° for each rib 20. After five ribs and in the section plane B-B, the angular position of the regions 22 with a smaller radius and the angular position of the regions 24 with a larger radius has then been twisted through 50° counterclockwise compared with the angular position at the section plane A-A. As seen along the entire length of the shank 12, this results in the helical twist of the polylobular cross sections of the ribs 20 or the twist of the polylobular cross sections as seen along the length of the shank 12.

FIG. 5 shows an isometric illustration of the connecting element 10 in FIG. 1 obliquely from above. The apexes of the regions 22 with a smaller radius are again indicated on the individual ribs 20 by dashes and, as a whole, the helical twist of the polylobular cross sections of the ribs 20 as seen along the length of the shank 12 can be seen.

FIG. 6 shows a connecting element 30 according to the invention according to a further embodiment of the invention. The connecting element 30 has a shank 32, which extends along a longitudinal central axis 14 between a frustoconical end 13 and a head 16. The shank 32 has two subsections 34 and 36.

In the subsection 34, which extends from the head 16, a plurality of ribs 20 that extend in the peripheral direction are provided, as in the connecting element 10 in FIG. 1, In the subsection 34, the shank 32 is designed in the same way as the shank 12 of the connecting element 10 in FIG. 1 the individual ribs 20 each have a polylobular cross section with three regions 22 with a smaller radius and three regions 24 with a larger radius, and the angular position of the regions 22 with a smaller radius and of the regions 24 with a larger radius changes in the longitudinal direction of the shank 32. This is apparent in FIG. 6 from the regions 22 with a smaller radius, which are marked by dashes.

The subsection 34 of the shank 32 has only nine consecutive ribs 20, however, and then transitions into the subsection 36, in which ribs 40 are provided that extend in the axial direction. The ribs 40 each have a triangular cross section. A cross section of the shank in the subsection 36 is generally circular. The external edges, extending parallel to the longitudinal central axis 14, of the ribs 40 therefore all lie on a circle about the longitudinal central axis 14.

In the context of the invention, the cross section of the shank 32 can also be designed to be polylobular in the subsection 36 with a plurality of regions with a smaller radius and a plurality of regions with a larger radius. The angular position of the regions with a smaller radius and a larger radius can be constant in this case, such that the shank is designed to be polylobular and cylindrical in the subsection 36. Alternatively, the angular position of the region with a smaller radius and with a larger radius can also change in the subsection 36 in the longitudinal direction of the shank 32. A change in angle of the regions with a smaller radius and of the regions with a larger radius by 10° to 40°, in particular by 10° to 20°, per millimeter of length of the shank 32 is preferred.

On the opposite side from the shank 32, i.e. on the left-hand side of the head 16 in FIG. 6, connecting element 30 is provided with a threaded bolt 42. After the connecting element 30 has been pressed into or embedded in a component, a further component can be fastened to the threaded bolt 42 and be secured for example by a nut on the threaded bolt 42.

After the shank 32 of the connecting element 30 has been pressed into or embedded in a component, the subsection 36 of the shank 32 secures the connecting element 30 against twisting, i.e. against twisting about the longitudinal central axis 14. As was explained using the connecting element 10 in FIG. 1, the subsection 34 of the shank 32 provides security against pulling out along the longitudinal central axis 14, i.e. to the left in FIG. 6.

FIG. 7 shows an isometric illustration of the connecting element 30 in FIG. 6 obliquely from above. The threaded bolt 42 is illustrated only schematically in FIG. 7. The position of the regions 22 with a smaller radius on the shank 32 and specifically in the subsection 34 can be seen. The regions 22 with a smaller radius of the individual ribs 20 are not aligned with one another but are arranged in an offset manner with respect to one another as seen in the longitudinal direction of the shank 32.

FIG. 8 shows a connecting element 50 according to a further embodiment of the invention in an isometric illustration obliquely from above. The connecting element 50 has a shank 52 with numerous ribs 20 extending in the peripheral direction. The cross section of the ribs 20 corresponds to the cross section already explained with reference to FIG. 1. As a whole, the shank 52 thus has a sawtooth-like contour.

The connecting element 50 has a head 16 and a frustoconically designed free end 18.

The individual ribs 20 are designed in an identical manner, as was explained with reference to FIGS. 1 to 5. However, in the case of the connecting element 50 in FIG. 8, the change in the angular position of the regions 22 with a smaller diameter and of the regions 24 with a larger diameter on each rib 20 is different from the connecting element 10 in FIG. 1. This is already apparent in FIG. 8 from the arrangement of the dashes on each rib 20, which mark the position of the apexes of the regions 22 with a smaller diameter.

Figure 11:
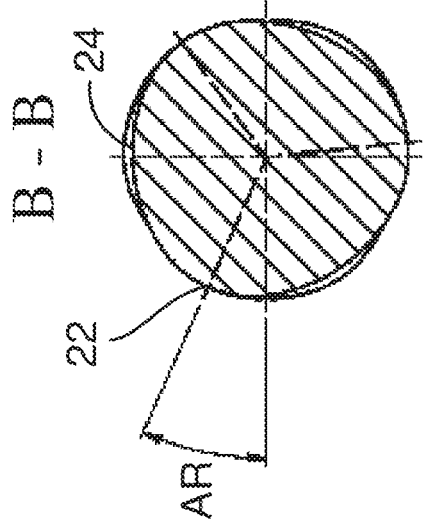
FIG. 11 shows a view on the section plane A-A in FIG. 9.

FIG. 9 shows a side view of the connecting element 50 in FIG. 3, and FIG. 10 shows a front view of the connecting element 50 in FIG. 9, i.e. from the right in FIG. 9. In the case of the connecting element 50 in FIGS. 8 to 10, the angular position of the regions 22 with a smaller diameter and of the regions 24 with a larger diameter changes partially in the clockwise direction and partially in the counterclockwise direction from rib 20 to rib 20. FIG. 11 shows a view on the section plane A-A in FIG. 9. In FIG. 11, the angular position of the regions 22 with a smaller diameter and of the regions 24 with a lager diameter on the, see FIG. 9, first rib 20 can be seen, which immediately follows the frustoconical end 18 in the direction of the head 16. The region 22, illustrated on the left in FIG. 11, with a smaller diameter lies on a horizontal line.

Figure 12:
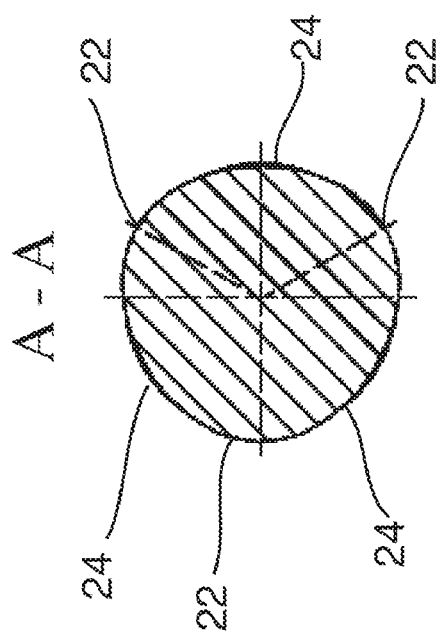
FIG. 12 shows a view on the section plane B-B in FIG. 9.

FIG. 12 shows a view on the section plane B-B in FIG. 9. FIG. 12 thus shows the angular position of the regions 22 with a smaller diameter and of the regions 24 with a larger diameter at the fifth rib 20 starting from the frustoconical end 18. It is apparent that the region 22, located on the left in FIG. 12, with a smaller diameter is arranged in a manner twisted clockwise through an angle AR with respect to a horizontal line.

Figure 13:
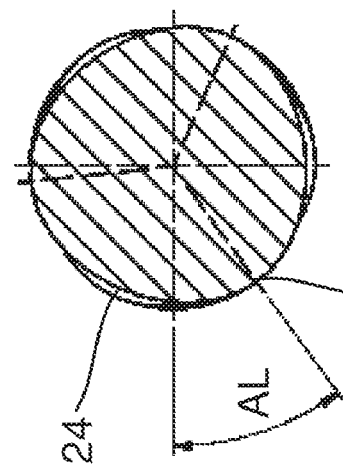
FIG. 13 shows a view on the section plane C-C in FIG. 9.

FIG. 13 shows a view on the section plane C-C in FIG. 9 and thus illustrates the angular position of the regions 22 with a smaller diameter and the angular position of the regions 24 with a larger diameter at the sixth rib 20, starting from the frustoconical end 18, of the shank 52. It is apparent from FIG. 13 that the region 22, located on the left in FIG. 13, with a smaller diameter is arranged in a manner twisted counterclockwise through an angle AL with respect to a horizontal line.

The angular position of the regions 22 with a smaller diameter and of the regions 24 with a larger diameter thus changes partially in the clockwise direction or in a negative direction of rotation, and partially in the counterclockwise direction or in a positive direction of rotation, as seen in the longitudinal direction of the shank 52. As a result, it is possible for regions 22 with a smaller diameter on the individual ribs 20, which of course protrude in a radial direction, to be aligned with one another or to be located one above another in projection only after a relatively large number of ribs. As a result, a pull-out force of the connecting element 50 can be improved even further.

From the position, indicated in FIG. 9 by means of dashes on the individual ribs 20, of the regions 22 with a smaller diameter, it is possible to see that, starting from the frustoconical end 18, the angular position of the regions 22 is initially changed in the clockwise direction between the first rib 20 and the second rib 20, but is changed again in the clockwise direction from the second rib to the third rib.

Figure 19:
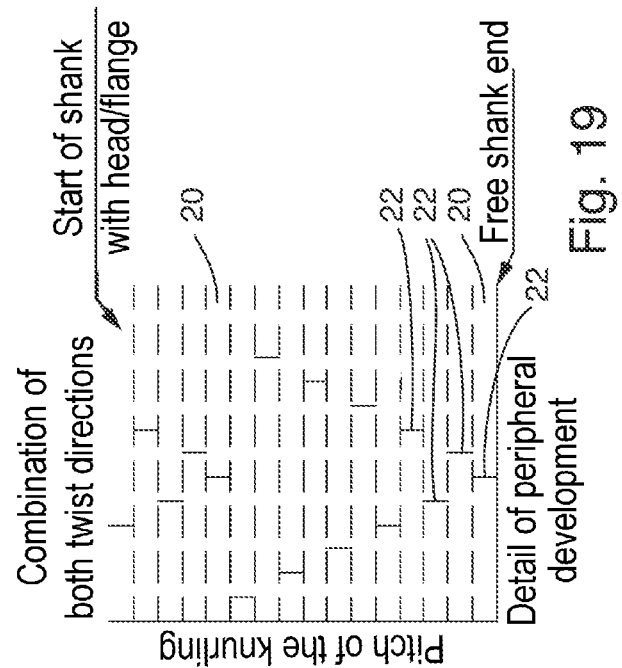
FIG. 19 shows a schematic illustration of a peripheral development of a connecting element according to a further embodiment of the invention.
Figure 17:
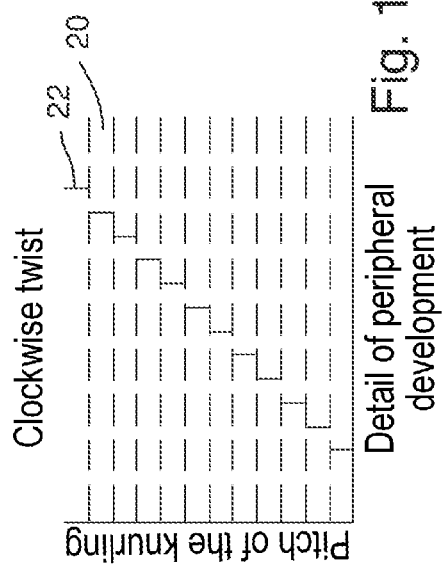
FIG. 17 shows a schematic, partial illustration of a peripheral development of a further embodiment of a connecting element according to the invention.
Figure 18:
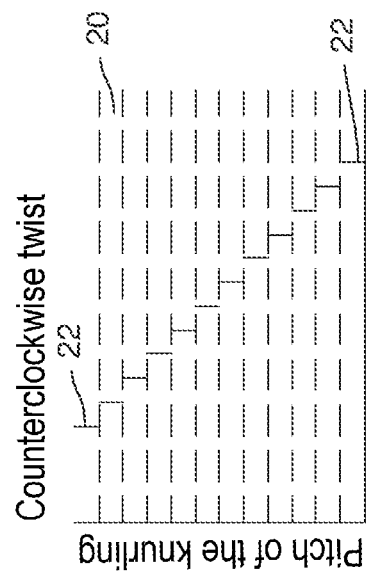
FIG. 18 shows a schematic, partial illustration of a peripheral development of a connecting element according to a further embodiment.

A detailed explanation of the possible directions of change and arrangements of the regions 22 with a smaller diameter and of the regions 24 with a larger diameter along the shank of a connecting element follows with reference to FIGS. 17 to 19.

FIG. 14 shows an isometric illustration of a further connecting element 70 according to the invention. The connecting element 70 has a shank 72 having two subsections 74 and 76. In the subsection 74, ribs 20 are arranged in the peripheral direction, and, in the subsection 76, ribs 40 extend in the axial direction. The subsection 76 is adjoined by a head 78. The connecting element 70 is provided with a through-bore or through-opening 80, cf. also FIG. 16. The connecting element 70 can be embedded in or pressed into a component and then provides a core hole bore by means of the through-opening 30, into which a further component for example can be inserted or into which a fastening screw can be screwed.

Figure 15:
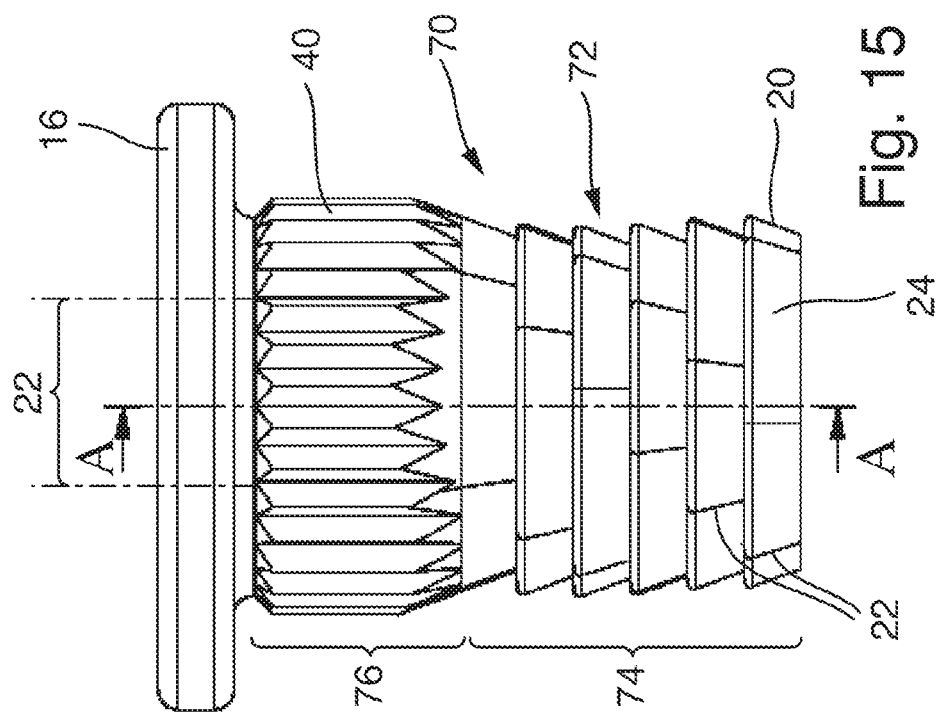
FIG. 15 shows a side view of the connecting element in FIG. 14.

FIG. 15 shows a side view of the connecting element 70 in FIG. 14. In the subsection 74 of the shank 72, a total of five ribs 20 are arranged in succession, which are designed like the ribs 20 of the connecting element 10 in FIG. 1 and therefore will not be explained again. The regions 22 with a smaller radius of the periphery of the shank 22 in the region of the individual ribs 20 are again indicated by dashes in FIG. 15. It is apparent that the position of the regions with a smaller radius and consequently also the position of the regions with a larger radius changes in the clockwise direction from rib 20 to rib 20.

In the subsection 76, which is located between the end of the subsection 74 and the head 16, the ribs 40 extending in the axial direction are arranged. A cross section of the shank 72 in the subsection 76 is likewise designed in a polylobular manner, however, and has three regions with a smaller radius and three regions 24 with a larger radius. In the illustration in FIG. 15, region 22 with a smaller radius faces the viewer. In the subsection 76, too, the shank 72 thus has a polylobular cross section. As a result, securing against twisting about a longitudinal central axis of the connecting element 70 can be increased.

Figure 16:
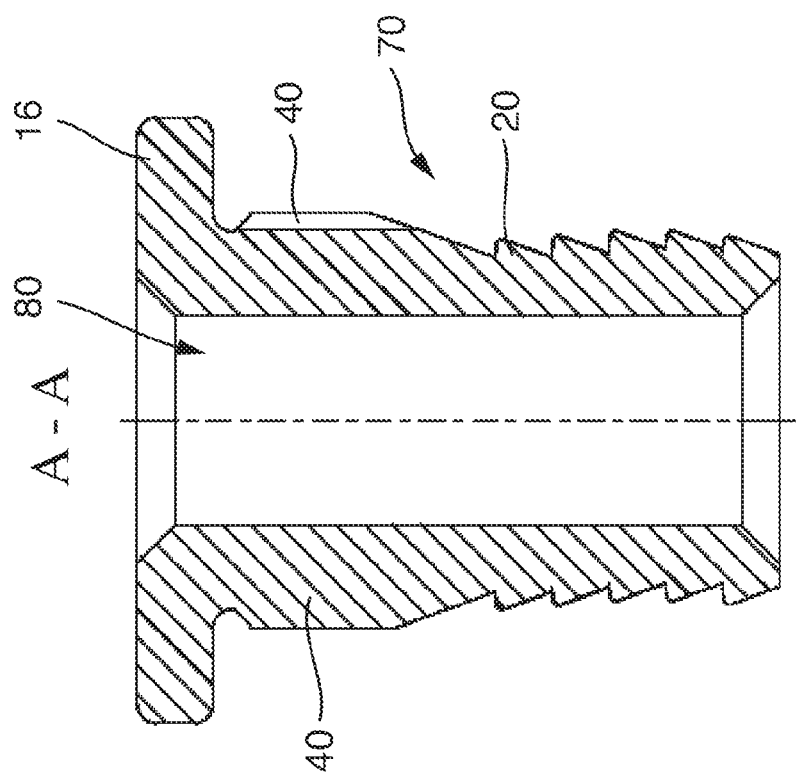
FIG. 16 shows a view on the section plane A-A in FIG. 15.

FIG. 16 shows a view on the section plane A-A in FIG. 15.

FIG. 17 schematically shows a detail of a peripheral development of a connecting element according to the invention, in which a change or twisting of the angular position of the regions with a smaller radius or larger curvature and of the regions with a larger radius or smaller curvature occurs in the clockwise direction along the shank. The individual lines of the development represent ribs 20 extending in the peripheral direction, and vertical lines represent the apexes of regions 22 with a smaller radius. It is apparent from FIG. 17 that, from rib to rib, the angular position of the regions 22 with a smaller radius changes by a constant amount. As seen along the shank of a connecting element, this results in a helical arrangement of the apexes of the region 22 with a smaller radius, as was explained with reference to FIG. 1.

FIG. 18 shows an illustration similar to the illustration in FIG. 17. FIG. 18 shows a counterclockwise change or twisting of the angular position of the regions 22 with a smaller radius, wherein, from rib 20 to rib 20, the angular position changes by a constant amount. Such an embodiment also results in a helical juxtaposition of the regions 22 with a smaller radius as seen along the length of the shank of a connecting element, as has already been explained with reference to FIG. 1.

FIG. 19 shows a schematic illustration of a detail of a peripheral development of a connecting element according to the invention in an illustration comparable to FIGS. 17 and 18. By way of FIG. 19, a change or twisting of the angular position of the regions 22 with a smaller radius and of the regions 24 with a larger radius in different directions, i.e. in the clockwise direction and in the counterclockwise direction, is intended to be explained.

At the bottom of FIG. 19, a first rib 20 is illustrated at the free shank end of the connecting element; compared with FIG. 9, this would be the first rib 20 that is illustrated on the right in FIG. 9 and follows the frustoconical end 18. This rib 20 has a region 22, arranged in the middle in FIG. 19, with a smaller radius. The regions 22 with a smaller radius for example of the apexes can also be referred to as high points of the polylobular cross section.

Starting from this first rib 20, the angular position of the region 22 then changes in the clockwise direction to the following rib. In FIG. 19, the region 22 of the second rib is thus arranged to the right of the region 22 of the first rib. In the following rib, however, the angular position changes in a counterclockwise direction, specifically by the same value of the angle, with respect to the angular position of the region 22 on the first rib, as from the first rib 20 to the second rib 20. The region. 22 is thus illustrated, on the third rib in FIG. 19, to the left of the region 22 on the first rib. On the fourth rib, the angular position again changes in the clockwise direction, specifically by the same value of the angle with respect to the angular position on the second rib. On the fifth rib, the angular position again changes in the counterclockwise direction, specifically by the same value of the angle with respect to the position on the third rib.

As seen along the shank, cf. also FIG. 9, the regions 22 with a smaller radius are located on the even numbered ribs, i.e. on the second rib, on the fourth rib, on the sixth rib, on the eighth rib and on the tenth rib. The shape of a helix extending clockwise around the shank is produced. By contrast, on the odd numbered ribs, i.e. on the third rib, fifth rib, seventh rib, ninth rib and eleventh rib, the regions 22 with a smaller radius lie on a helix turning counterclockwise along the shank.

It is also apparent from FIG. 19 that, on the twelfth rib 20, the same position of the regions 22 with a smaller radius and of the regions 24 with a larger radius has been reached as on the first rib.

It is readily apparent from the illustration in FIG. 19 that the regions 22 with a smaller radius or the high points of the polylobular cross sections are again aligned or located one above another in projection only after twelve ribs. As a result, all the ribs can reliably engage in the material, of a core hole into which they are pressed or in which they are embedded, and extremely reliable anchoring with a very high pull-out force can be achieved.

FIG. 20 shows a view of a further connecting element 10 according to the invention from below. The connecting element 10 is designed substantially identically to the connecting element 10 in FIG. 1, wherein the minor differences are explained with reference to FIG. 24.

Readily apparent are the head 16 and the shank 12, designed in a polylobular manner in cross section, with the frustoconical narrowing 18. In FIG. 20, three section planes A-A, B-B and C-C are indicated, which extend parallel to the longitudinal central axis 14, see also FIG. 1, and which each contain the longitudinal central axis, and are therefore oriented radially. The section lines A-A, B-B and C-C are each arranged at a different angle. Between the section planes A-A and C-C there is an angle of 120°. Between the section planes A-A and B-B there is an angle of 60°. Between the section planes B-B and C-C there is likewise an angle of 60°. Since the polylobular cross section of the shank 12 has three regions, spaced apart regularly from one another by 120° in each case, with a smaller radius or larger curvature, and wherein regions with a larger radius or smaller curvature, which are likewise spaced apart regularly from one another, are arranged between each of the regions with a smaller radius, the cross section repeats three times, between the section pianos A-A and C-C, around the whole periphery of the shank 12. Therefore, for the sake of clarity, only the three section planes A-A, B-B and C-C are indicated.

FIG. 21 shows a partial illustration of the view on the section plane A-A. It is apparent that the shank 12 has an undulating external contour in the section plane A-A. It is also apparent that a profile depth of the ribs 20 changes only a little along the length of the shank 12. In the context of the invention, the profile depth of the ribs 20 is intended to change by at most 50%. In the embodiment illustrated, the profile depth of the ribs 20 changes only by at most 10%.

FIG. 22 shows a view on the section plane B-B in FIG. 20. In this section plane, too, the shank 12 has an undulating external contour. It is also apparent in this section plane that a profile depth of the ribs 20 changes only a little, and by at most about 10% in the embodiment illustrated, as seen along the length of the shank 12.

FIG. 23 shows a view on the section plane C-C in FIG. 20. Since the section plane C-C is spaced apart from the section plane A-A by 120° as seen around the longitudinal central axis 14, the view on the section plane C-C corresponds to the view on the section plane A-A. In the section plane C-C, too, the shank 12 has an undulating external contour and the profile height of the ribs 20 changes only a little as seen along the length of the shank.

It is also apparent from FIGS. 20 to 23 that the shank 12 has a polylobular cross section at each point. Both the outside diameter of the shank and the core diameter of the shank between the ribs 20 is designed in a polylobular manner in each case. This is apparent from the wave shape of the external contour of the shank 13 in FIGS. 21, 22 and 23, and then also from the imaginary connecting line of the valleys between the ribs 20, which likewise has a wave shape. This inner line, indicated in a dashed manner, which connects the wave valleys between the ribs 20, clarifies the core diameter. It is readily apparent from FIGS. 21 to 23 that both the outside diameter of the shank 12 and the core diameter have a polylobular profile. The outside diameter or the external contour is illustrated by the imaginary dashed line indicated in FIGS. 21, 22 and 23, which connects the wave peaks, and therefore the outer portions of the ribs 20, together.

FIG. 24 shows a side view of the connecting element in FIG. 20. The head 16 and the shank 12 with the ribs 20 and the frustoconical narrowing 18 can be seen. The connecting element 10 in FIG. 24 is, apart from the smaller distance between the rib 20 located closest to the head 16 and the head 16, designed identically to the connecting element 10 in FIG. 1. Elements of the connecting element 10 that are designed identically to the connecting element 10 in FIG. 1 will therefore not be explained again and bear the same reference signs.

Two section planes A-A and B-B are indicated in FIG. 24. The section plane A-A extends through the point of the narrowing 18 with the greatest diameter. This point of the narrowing 18 with the greatest diameter corresponds, in terms of its external dimensions, to the external dimensions of the ribs 20, but, as has already been explained, is twisted about the longitudinal central axis with respect to the other ribs 20.

The section plane B-B extends through the valley between the point of the narrowing 18 with the greatest diameter and the rib 20 following the narrowing 18 in the direction of the head 16. Therefore, in the section plane B-B, the profile of the core diameter or of the transverse dimension of the shank 12 between two ribs 20 can be seen. The dimensions of the shank 12 in the section plane B-B correspond, in terms of their size, to the dimensions of the shank 12 between two ribs 20 in each case. As has been explained, the cross section in the section plane B-B is twisted about the longitudinal central axis 14, however, compared with the cross sections between any two ribs 20.

FIG. 25 shows a view on the section plane A-A in FIG. 24. The direction of view is in the narrowing direction of the narrowing 18. From this direction of view, only the outside diameter, or the largest transverse dimensions, of the narrowing 18 is apparent, which is why this position of the section plane A-A was chosen. In FIG. 25, it is apparent that the cross section is designed in a polylobular manner in the section plane A-A. This is readily apparent from the solid line in FIG. 25. All the ribs 20 have such a polylobular cross section, as illustrated in FIG. 25, and only the angular position about the longitudinal central axis 14 changes, as was set out in detail above.

Additionally indicated in FIG. 25 is an imaginary envelope circle 80, which has been drawn using a dashed line. Also illustrated is an imaginary maximum inscribed circle or incircle 82, which is likewise indicated by means of a dashed line. As has already been described, three regions with a larger radius and smaller curvature are in contact with the envelope circle 80 at a spacing of 120° about the longitudinal central axis and three regions with a smaller radius and larger curvature are in contact with the maximum inscribed circle or incircle 32.

FIG. 26 shows the view on the section plane B-B in FIG. 24. It is apparent from FIG. 25 and FIG. 26 that the shank 12 has a polylobular shape in each case both between the ribs 20 and at the highest points or the ribs 20. In FIG. 26, the external contour of the narrowing 18 at the point thereof with the largest transverse dimensions can also be seen. This is illustrated by means of a solid-line circle 34. The external contour in the section plane B-B is illustrated by means of a solid line 86. It is apparent from FIG. 26 that a profile depth, that is to say a distance in a radial direction starting from the longitudinal central axis 14 between the lines 86 and 84, changes only a little around the periphery of the shank 12. In the embodiment illustrated, the profile depth changes only by about 10%.

It is also apparent from FIG. 26 that the angular position of the greatest transverse dimensions in the section plane B-B and the angle of the greatest transverse dimensions in the section plane A-A, i.e. between the lines 86 and 84, changes. At the line 84, corresponding to the cross section in the section plane A-A, a greatest transverse dimension lies vertically above the longitudinal central axis 14. In the case of the line 86, by contrast, the greatest transverse dimension lies a little to the left or has been shifted counterclockwise. As has already been set out, the angular position of the greatest transverse dimensions of the ribs 20 changes from rib to rib.

The invention claimed is:

1. A connecting element for pressing into or embedding in a component, comprising:
   a shank which extends along a longitudinal central axis of the connecting element, wherein the shank is provided with ribs extending in a radial direction with respect to the shank and wherein the shank has, at least partially, a polylobular cross section,
   wherein the periphery of the polylobular cross section is convexly curved along its entire length, and, as seen in the radial direction, has regions with a larger radius or smaller curvature and regions with a smaller radius or larger curvature,
   further wherein an angular position of the regions with a smaller radius or larger curvature and of the regions with a larger radius or smaller curvature changes along the shank, as seen along the longitudinal central axis.

2. The connecting element as claimed in claim 1, wherein the angular position of the regions with a smaller radius or larger curvature and of the regions with a larger radius or smaller curvature changes by a constant amount per unit length along the shank.

3. The connecting element as claimed in claim 1, wherein the polylobular cross section has n regions with a smaller radius or larger curvature, and in that the angular position changes by an angle of 360 degrees/n along the entire length of the shank.

4. The connecting element as claimed in claim 1, wherein regions with different polylobular cross sections alternate as seen along the length of the shank.

5. The connecting element as claimed in claim 1, wherein regions with a circular cross section and with a polylobular cross section alternate as seen along the length of the shank.

6. The connecting element as claimed in claim 1, wherein, in the portion of the shank with a polylobular cross section, the shank has a polylobular cross section at each point of said portion.

7. The connecting element as claimed in claim 1, wherein, in the portion of the shank with a polylobular cross section, a sectional view of the shank exhibits an undulating external contour at each angular position about the longitudinal central axis, and, in the sectional view, an imaginary line that connects the deepest points between two ribs extends in an undulating manner.

8. The connecting element as claimed in claim 7, wherein the angular position of the regions with a smaller radius or larger curvature and of the regions with a larger radius or smaller curvature changes by 10° to 40° for each rib as seen in the longitudinal direction of the shank.

9. The connecting element as claimed in claim 1, wherein, in the portion of the shank with a polylobular cross section, a profile depth of the ribs changes by at most 50%.

10. The connecting element as claimed in claim 1, wherein, in the portion of the shank with a polylobular cross section, a profile depth of the ribs changes by at most 10%.

11. The connecting element as claimed in claim 1, wherein the cross section is designed as a curve of constant width.

12. The connecting element as claimed in claim 1, wherein the cross section has three regions with a smaller radius or larger curvature and three regions with a larger radius or smaller curvature.

13. The connecting element as claimed in claim 12, wherein the angular position of the regions with a smaller radius or larger curvature and of the regions with a larger radius or smaller curvature changes in a clockwise and/or counterclockwise direction as seen along the longitudinal central axis.

14. The connecting element as claimed in claim 1, wherein the periphery of the cross section is designed to be continuous without corners.

15. The connecting element as claimed in claim 1, wherein the ribs extend at least partially in the peripheral direction.

16. The connecting element as claimed in claim 1, wherein the ribs extend at least partially in an axial direction.

17. The connecting element as claimed in claim 1, wherein the ribs extend along at least a part of the length of the shank in the peripheral direction, and in that the ribs extend along at least a part of the length of shank in the axial direction.

18. The connecting element as claimed in claim 1, wherein the ribs extend at least along a part of the length of the shank in the peripheral direction, and in that the angular position of the regions with a smaller radius or larger curvature and of the regions with a larger radius or smaller curvature changes alternately in a positive direction and in a negative direction starting from a first rib.

19. The connecting element as claimed in claim 1, wherein the angular position of the regions with a smaller radius or larger curvature and of the regions with a larger radius or smaller curvature changes by 10 degrees to 40 degrees per millimeter of length of the shank, in a part of the shank having ribs extending in an axial direction.

20. The connecting element as claimed in claim 1, wherein the connecting element is formed at least partially from steel, aluminum, copper or brass.

21. The connecting element as claimed in claim 1, wherein the entire length is a circumferential length of the polylobular cross section and the regions with a larger radius or smaller curvature and regions with a smaller radius or larger curvature are along the periphery of the shank.

* * * * *